N. H. Bolton.
Sawing Mach.
No. 112,114. Patented Feb. 28, 1871.

Witnesses
O. Hinchman
Wm. F. Clark

Inventor
N. H. Bolton
per Munn & Co.
Attorneys

United States Patent Office.

N. H. BOLTON, OF OMRO, WISCONSIN.

Letters Patent No. 112,114, dated February 28, 1871.

IMPROVEMENT IN SAWING-MACHINES.

The Schedule referred to in these Letters Patent and making part of the same.

*To all whom it may concern:*

Be it known that I, N. H. BOLTON, of Omro, in the county of Winnebago and State of Wisconsin, have invented a new and improved Sawing-Machine; and I do hereby declare that the following is a full, clear, and exact description thereof, which will enable others skilled in the art to make and use the same, reference being had to the accompanying drawing forming part of this specification.

This invention relates to improvements in sawing-machines, whereby it is designed to provide a machine for sawing the "spalts" or waste blocks from shingle-machines into shingles in a manner to utilize the whole of the timber, of which a considerable percentage is now wasted, owing to the fact that in most shingle-machines the stock cannot be wholly worked up, the holding-dogs being in the way of the saws.

Similar letters of reference indicate corresponding parts.

Figure 1:
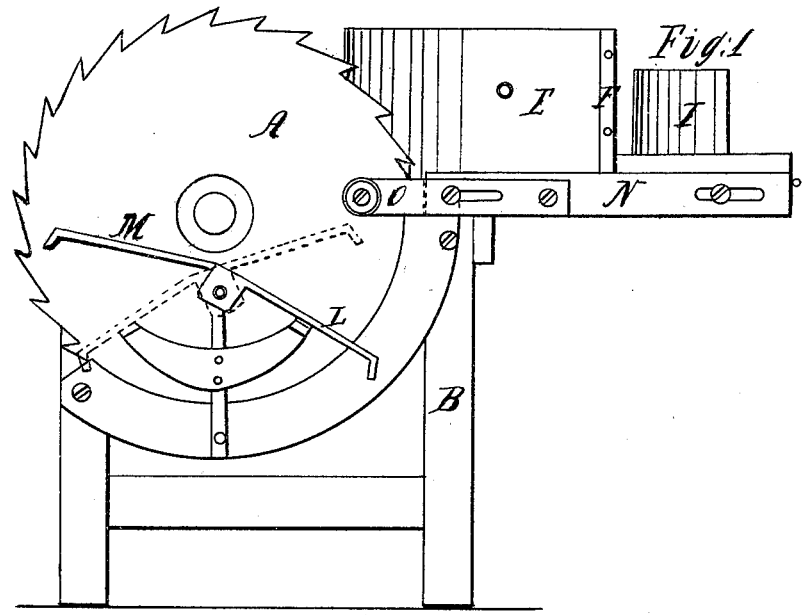
Figure 1 represents a side elevation of my improved machine.
Figure 2:
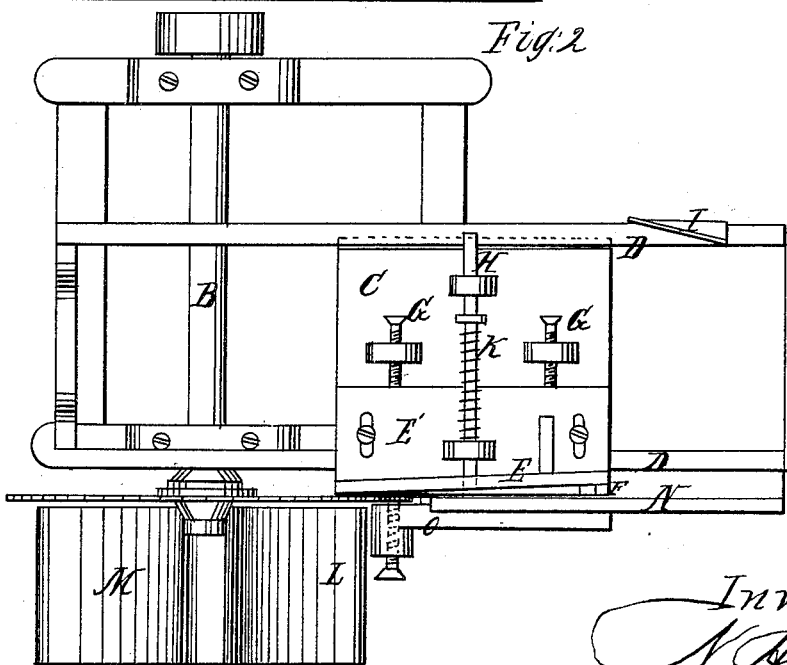
Figure 2 represents a plan view of the same.

A represents a circular saw, working on a bench, B, in a horizontal position in a manner common to sawing-machines.

C represents a carriage arranged to move along one side of the saw on the parallel ways D, and so connected to the said ways as to work equally well horizontally or vertically.

E is a timber-rest adjustably connected to the carriage perpendicularly thereto, the end nearest the said mandrel being adjusted closely to the saw, while the other end recedes about the thickness of the thick end of the shingles, and is provided with a vertical stop F.

The timber or block-support E is provided with a horizontal part, E', so connected to the carriage C as to be adjusted to or from the saw by the set-screws F G, for adjusting the thickness of the shingles.

H represents a discharger, supported in suitable guides on the carriage, and projecting at one end through the timber-support E in a manner to be thrust forward by an inclined guide, I, fixed on one of the ways, D, against which the outer end of the said discharger strikes just previous to the end of the return movement of the carriage.

The discharger is drawn back by a coiled spring, K.

The "spalts" or waste blocks from the shingle-machine, which are commonly thick enough to make two or three shingles, are set edgewise on the carriage in front of the support E, in advance of the stop F, and there held by one hand while the carriage is moved forward against the saw and a shingle cut therefrom. If the block be thick enough for two shingles one cutting completes the operation, the cutting being diagonally through the block, the outer shingle falling on the part L of a tilting-table pivoted near the axis of the saw, and being delivered thereby with the shingles discharged from the carriage.

If the piece to be sawed will make but one shingle the table is to be tipped from the operator, which carries the cull or shim off back of the machine; but if the piece is large enough for another shingle the table is turned toward the operator, and the piece slides back to be re-sawed.

The turning of the table is accomplished by the operator while in the act of sawing a shingle, by being touched with the next piece to be sawed.

N represents an adjustable rest, secured to the guide-rail next the saw in a manner to be adjusted to or from the saw. The block rests on this support, as well as on the carriage, while being fed up the saw.

This adjustable rest also supports an adjustable saw-gauge, O, for guiding the periphery of the saw.

Having thus described my invention,

What I claim as new, and desire to secure by Letters Patent, is—

The carriage C, adjustable rest E E', spring-retracted discharger H, inclined guide I, and saw-gauge O, all combined as described, and operated in connection with the saw, for the purpose specified.

N. H. BOLTON.

Witnesses:
A. J. WHITE,
A. WILSON.